United States Patent [19]

Denney

[11] 3,715,188

[45] Feb. 6, 1973

[54] CHOLESTEROL ASSAY AND REAGENTS THEREFOR
[75] Inventor: Jerry W. Denney, Carmel, Ind.
[73] Assignee: American Monitor Corporation, Indianapolis, Ind.
[22] Filed: April 30, 1971
[21] Appl. No.: 139,266

[52] U.S. Cl. .................................................23/230 B
[51] Int. Cl. ............................................G01n 33/16
[58] Field of Search ......................23/230 B; 252/408

[56] References Cited

UNITED STATES PATENTS 3,558,516  1/1971  Wybenga ..........................23/230 B X
3,615,232  10/1971  Parekh et al. ........................23/230 B Primary Examiner—Morris O. Wolk
Assistant Examiner—R. M. Reese
Attorney—Robert A. Spray

[57] ABSTRACT

A cholesterol assay, using formamide, which achieves the simplicity of a direct test of a specimen sample, yet which also achieves a comparable specificity and accuracy of cholesterol assays involving multiple-extraction steps. The formamide destroys the cholesterol chromophore of a blank measurement, and this result may be compared with a companion cholesterol assay to eliminate the error caused by the chromophore of non-cholesterol chromogenic substances of the specimen; and the formamide also keeps the alcohol, which is used to prevent turbidity, from blocking the formation of the bilirubin portion of the non-cholesterol chromogenic substances.

11 Claims, No Drawings

CHOLESTEROL ASSAY AND REAGENTS THEREFOR

Introductory Comments as to the Significance, Nature and Other Factors as to Cholesterol Present in Blood Serum, and as to the Need for Accurate Measurement Thereof.

Cholesterol, which is one of the fatty materials found in the blood serum, and which is formed primarily in the liver, is generally acknowledged to be very significant as a factor in various disease processes of the human body, including diseases of the heart, vascular system, etc.

The implication of cholesterol in the etiology and prognosis of atherosclerosis and heart disease has stimulated an enormous growing literature on the subject, much of it asserting and acknowledging that there appears to be a statistically significant relation between high serum cholesterol levels and the incidence of coronary artery disease; and this relation has made it considered to be desirable to maintain low, or at least low normal, levels of cholesterol in serum.

Thus, accurate cholesterol measurement of serum cholesterol is very desirable, since if an individual is falsely diagnosed to have an unduly high cholesterol level, he may be wrongfully placed on an unpleasant or expensive corrective diet; or, if the diagnosis is too low, a person who might need the benefit of such corrective diet may go untreated.

Correct cholesterol measurement is also needed to avoid a falsely high cholesterol diagnosis which might cause a thyroid disease to be unsuspected or overlooked, for certain thyroid diseases characteristically cause a low cholesterol level. Hyperthyroidism is associated with hypocholesterolemia to such an extent that serum cholesterol measurement has been used to monitor thyroid status; and the need for cholesterol measurement accuracy is thus again noted.

Diseases of the liver alter cholesterol levels, and the measurement of serum cholesterol yields information relating to the functioning of the liver, such as the ability of the liver cells to manufacture various compounds.

Not only is the serum cholesterol level of an individual important but also it is important that the accuracy of the assay be close enough so as to reliably so detect any change which might occur from day to day, week to week, or month to month; since it is important to follow drug and diet therapy, and to detect cholesterol changes induced thereby, and/or changes of body response. If the test performed is not sufficiently reliable and specific, variation in some interfering substance might be falsely interpreted as a trend in cholesterol level, particularly since the interfering substances themselves change in concentration from time to time, and not at all always proportionately to any change of cholesterol.

Thus, although a sufficiently accurate measurement of cholesterol in body fluids has been long recognized to be a valuable and vitally desired diagnostic factor, its measurement has continued to be a problem. The prior art has attempted various methods of cholesterol measurement; but an inherent and continuing problem has been that of the masking or interference of other substances in the specimen to be assayed. Thus direct or non-sequential methods have not avoided the uncertainty or error attributable to those other substances; and multi-step or sequential methods for extracting the non-cholesterol substances have caused higher assay costs, and their complexity contributes to an increased chance of error.

As a vividly illustrative criticism of the thorough dissatisfaction and recognized unreliability of the cholesterol assays of the prior art, the Yale professor who is Chairman of the Yale University School of Medicine (Section of Laboratory Medicine) has very recently written: "I believe that more than 90 per cent of cholesterol values currently issued to physicians are unsuitable for the practice of medicine or clinical research."[1](The New England Journal of Medicine, p. 394, (Feb. 18, 1971).)

Perhaps the reason for this alleged unsuitability is the fact that those methods which are most reliable in the art prior to the present invention are also the most complicated and time consuming and thus are not widely used. That these methods would be used in spite of their unreliability problems might be explained by the fact that many standardization and quality control programs do not include sources of interference in the standardization and control specimens; and often performance is judged in comparison to other laboratories in the programs who may also be doing inaccurate testing.

PRIOR ART METHODOLOGY FOR CHOLESTEROL ANALYSIS

The number of procedures available for the determination of cholesterol and its esters is multitudinous, and yet the fundamental chemistry on which they depend may be considered to be basically similar or in many respects identical. It has been known for a long time that the two reactive centers in the cholesterol molecule are represented by the double bond and the hydroxyl group; of these, the double bond is the most important in the formation of color or chromophore.

Cholesterol reacts with strongly acid reagents to produce colored substances, chiefly cholestadiene sulfonic acids. In virtually all procedures, acetic acid and acetic anhydride are used as solvents and dehydrating reagents, and sulfuric acid or sulfuric acid and p-toluenesulfonic acids are used as dehydrating and oxidizing reagents. In some procedures, the reaction of these agents is further accelerated by the addition of various metal ions, including among others iron, aluminum, or cobalt. As Vanzetti points out, by 1935 over 150 different methods had been proposed, and since then, still more have appeared.[2](2. Vanzetti, G.: Clin. Chim. Acta, 10: 389, 1964.)

The general reaction mechanism of the color tests for cholesterol is considered to be as follows:

COLOR REACTIONS OF CHOLESTEROL [3]

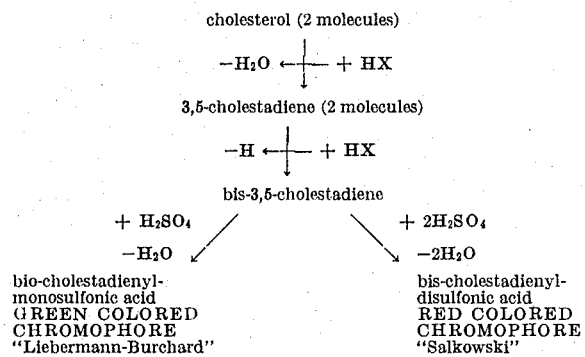

[3] Tietz, N. W., Fundamentals of Clinical Chemistry, p. 353 (W. B. Saunders, Philadelphia, Pa. 1970)

According to this scheme, cholesterol is first attacked by strongly acid reagents, generalized as "HX," where "X" would be, for example, the sulfate ion or the acetyl radical. Such reagents first remove a molecule of water, then oxidize the intermediate to produce 3,5-cholestadiene (two double bonds). The oxidizing agent is usually sulfuric acid, which is converted to sulfur dioxide. The cholestadiene is attacked still further to form the dimer, bis-cholesta-3, 5-diene, and is finally converted by the excess sulfuric acid, to a mono- or disulfonic acid which is a highly colored molecule. Depending on the relative concentration of the oxidant, sulfuric acid, one gets either a green color (Liebermann-Burchard) due to a monosulfonic acid, or a red color (Salkowski) due to the formation of disulfonic acid. The addition of iron or other metal ions favors the formation of the red color due to cholestadiene disulfonic acid. As Vanzetti points out, the reactions are not entirely specific, nor can they be controlled with sufficient precision to yield always the exact products shown, but with proper care, the reactions can be the basis of an accurate reproducible analytical system. Insofar as the chemistry is concerned, there is little reason to prefer a "red" color reaction over a "green" color reaction, except that the "red" reactions generally produce a compound with a higher molar absorbance than the "green." Choice of a specific procedure is, therefore, based on other issues. These may include the interference by such substances as bilirubin, by considerations of speed and facilities available, and factors such as the manipulations required in the sample preparation.[4] (4. Ibid.)

SINGLE-STEP PROCEDURES

In these methods, the sample is not purified to any degree, and the colorimetric reaction is performed directly on serum or plasma. These methods are liable to several errors. First, the ever-present protein may be charred during color development, thus producing a color which may be mistaken as coming from cholesterol. Secondly, such procedures may also suffer from interferences due to non-specific color-forming substances or chromogens, including bilirubin, hemoglobin, and protein, and by instability of the final colored product. It can be said as to these procedures that they are rapid, and that they require the least degree of manipulation, and that from a procedural standpoint they are perhaps best suited to automation; however, because of the above problems they are of doubtful accuracy for more than screening purposes. Examples of this type of procedure are the methods of Pearson, Stern, and McGavick,[5] (5. Pearson, J., Stern, S., and McGavack, T.H.: Anal. Chem. 25:813, 1953.) and Zlatkis, Zak and Boyle.[6] (6. Zlatkis, A., Zak, B., and Boyle, A. J.: J. Lab. Clin. Med., 41:486, 1953.)

TWO-STEP PROCEDURES

These methods introduce an extraction step, which extracts and partially isolates the cholesterol chromogen before chromophore or color development. For this reason, some of the interfering chromogens, especially protein, are removed, but the methods still are subject to error caused by non-specific chromogens, such as bilirubin which is extracted along with the cholesterol, and thus still provides a chromophore which is mistakenly measured as cholesterol chromophore. Of several methods in this class, that of Carr and Drekter[7] (7. Carr, J.J., and Drekter, I.J.: Clin Chem. 2:353, 1956.) is perhaps the best. Except for highly icteric samples (high bilirubin levels), it gives results that are in close correspondence to those obtained by more precise three-step methods; however, icteric samples are encountered with enough frequency as to create problems in routine analysis.

THREE-STEP PROCEDURES

These involve an extraction of the cholesterol followed by a saponification of the esters before color development. Consequently, they do not suffer from serious error because of protein. Furthermore, the saponification step tends to destroy nonspecific chromogens such as bilirubin, resulting in significantly increased accuracy over two-step methods. This class of procedures is best exemplified by the method of Abell et al.;[8,9] (8. Abell, L.L., Levy, B.B., Brodie, B.B., and Kendall, F.E., J.Biol.Chem., 195, 357, 1952.) (9. Henry R.J.: Clinical Chemistry, Principles and Technics, New York, Hoeber Division, Harper and Row Publishers, 1964.) which is accepted as a standard method in many laboratories, in spite of its complexity, as it is the least complicated method which is free of error from extraneous chromogens, prior to the present invention.

FOUR-STEP PROCEDURES

These are the most complicated, but the most reliable procedures of the prior art, if their complexity does not introduce errors which that very complexity makes possible. The cholesterol is extracted, the esters are saponified, and the total cholesterol is then further purified by collection as the digitonide. The digitonide is decomposed by saponification, which again frees the cholesterol, and the product of this step is subject to color development.

By introduction of the digitonin step, the effect of nonspecific chromogens is considerably reduced or eliminated, but then the cholesterol digitonide must be decomposed and the digitonin removed; otherwise, it too will give a positive reaction with the usual reagents since the digitonin structure includes a sterol ring as does cholesterol. Cholesterol and digitonin, however, do not have the same chromogenicity, and it is therefore advisable to remove the digitonin before performing the chromogenic reaction. Four-step procedures involve many separate steps, each of which requires careful control; nevertheless, methods of the multi-step type may be of high accuracy, and either the method of Schoenheimer and Sperry[10] (10. Schoenheimer, R., and Sperry, W.M.: J.Biol.Chem, 106:745, 1934.) or of Sperry and Webb[11] (11. Sperry, W.M., and Webb, M.: J.Biol.Chem., 187:97, 1950.) are the most widely accepted reference methods for the determination of cholesterol.

(Many other methods in each of the above categories could be cited, most of which represent slight modifications of those fundamental procedures.)

While multi-step measurements of cholesterol can give adequate results when properly used, serious errors may be encountered due to incomplete extraction resulting in poor recovery of cholesterol and by volumetric errors due to the number of volumetric measurements made. Moreover, multi-step measurements obviously have the disadvantages of being laborious and time-consuming, and therefore they tax the resources of a busy clinical laboratory to such an extent that direct methods are presently in wide use, even in spite of their lack of specificity and even in spite of their subjectivity to error from chromogenic substances other than cholesterol which are present in serum. The most desirable method would be one which may be performed directly upon serum, but which agrees more closely with more complicated multi-step methods such as that of Abell.

The present invention achieves a solution to goals which heretofore have appeared to be in effect contradictory to one another; that is, as now discussed, the present invention achieves substantially the simplicity of a direct test while nevertheless achieving specificity and accuracy comparable to those involving multiple-extraction steps.

THE PRESENT INVENTION

It has been discovered that when formamide in the proper concentration is added to a cholesterol reagent used to assay a sample of serum, under the proper conditions, the chromophore formed from the cholesterol of the serum is destroyed while the bilirubin, hemoglobin, and protein chromogens of the specimen react much as they do in the cholesterol reagent alone. Thus according to the concepts of the present invention, there is performed a companion blank spectrophotometric or colorimetric in which the effect of these non-cholesterol substances is in effect subtracted from the corresponding spectrophotometric or colorimetric test in which both the cholesterol and these substances react. By performing such a blank, the error contributed by these non-cholesterol chromogenic substances is sufficiently minimized in the assay, achieving satisfactory precision or accuracy of the measurement of cholesterol itself, unmasked by the chromophore of the other chromogenic substances present yet without multiple extraction steps.

(Other substances have been found which in some way prevent the formation of the color of chromophore from cholesterol chromogen. Alcohols, for instance, when used in the proper concentration have that effect. However, alcohols when used alone also prevent the formation of a chromophore from the bilirubin chromogen, and therefore when using only alcohol in a blank, bilirubin interference remains as a contributing error in the test; and a comparison of a blank measurement with a test measurement would give a total of bilirubin and cholesterol instead of specifically the desired measurement of cholesterol itself.)

Formamide when present in a cholesterol reagent destroys the chromophore-forming reaction of the cholesterol chromogen at room temperature; however, the bilirubin chromogen does not completely form its chromophore as required for proper blank correction, at room temperature. It has been found that the formamide-cholesterol reagent must reach an elevated temperature of about 80° C before sufficient chromophore formation from the bilirubin chromogen reaction will take place. Consequently, if formamide and the cholesterol reagent were mixed in a constant temperature water bath commonly used in certain widely used cholesterol methods, the bilirubin chromophore might not develop, and thus the contribution of the bilirubin chromogen may not be observed and would not be subtracted. However, it has been found that if the formamide is added to the blank tube at room temperature without constant-temperature incubation, the desired green bilirubin reaction occurs, that is, the green bilirubin chromophore forms while the cholesterol chromophore is eliminated. In this case the formamide serves two functions: First, one effect of its reaction with the cholesterol reagent is that it raises the temperature of the mixture to the proper range for the reaction, thus eliminating the necessity of incubation in a high temperature bath; and second, it has the desired effect on the bilirubin and cholesterol chromogen formation.

While formamide used alone permits the effect of chromophore formation from the bilirubin and other non-cholesterol chromogen and inhibits cholesterol chromophore development, it has been found that some turbidity develops in the blank in the presence of certain sera due to the presence of serum and that this turbidity falsely elevates the blank, by increasing the absorbence of the blank during colorimetric or spectrophotometric measurement, thus causing the turbidity to be mistaken for interfering chromogens, unless the turbidity is somehow accounted for or avoided.

This problem has been avoided in this invention by the concept of including in the mixture a high molecular weight alcohol (an alcohol with eight to 16 inclusive, carbon atoms per molecule). As discussed above, when alcohol is used alone in the blank determination, it does destroy the cholesterol chromophore, but it has the undesired effect of additionally destroying the desired formation of the bilirubin chromophore; however, it has been found that when a high molecular weight alcohol is used in conjunction with formamide, the desired bilirubin chromophore does form in the desired fashion and that turbidity is prevented from forming.

Formamide and a high molecular weight alcohol thus serve the desired function of preventing cholesterol chromophore development while allowing bilirubin chromophore development in a way in which turbidity is not observed; however, since the high molecular weight alcohols do not mix with the formamide, the formamide and alcohol must be added in two separate steps to the blank. This separateness of procedural steps is avoided in the present invention by the addition of the high molecular weight alcohol to the glacial acetic acid / acetic acid / sulfuric acid reagent. It has been found that a final concentration of approximately 2% V/V of the alcohol with respect to the cholesterol reagent is effective in eliminating the turbidity sometimes observed in the formamide-containing blank measurement and that inclusion of the alcohol in this reagent greatly simplifies the procedure over the procedure using separate addition of the alcohol.

Various high molecular weight alcohols differ in their effectiveness in eliminating turbidity; generally the higher molecular weights are more effective and can thus be used in lower concentrations.

1ST EMBODIMENT

Blank reagent: formamide
Cholesterol reagent:

166 ml H₂SO₄;
500 ml glacial acetic acid,
cool to room temperature;
add 500 ml acetic anhydride;
add 12 ml tridecyl alcohol.

The reagents are used in the following assay using a blank tube and a test tube:

Add 0.1 ml serum to both tubes. Add 1.0 ml Blank Reagent to the blank tube only. Add 2 ml of Cholesterol Reagent to the blank tube and 3 ml to the test. The blank tube is allowed to stand for 10 minutes at room temperature while the test is incubated at 37° C for 10 minutes after which the absorbence of the test at 620 mu is measured against the blank which is set to zero absorbence.

The absorbence of the test so measured is proportional to the concentration of cholesterol in serum, for the interfering chromogens contribute equally to both test and blank; and since the blank is set at zero absorbence, the absorbence of the test is a measurement of the difference between (or in effect a subtraction of) blank from test.

b 2ND EMBODIMENT

Same as 1st Embodiment, except 20 ml of isononyl alcohol is used instead of the tridecl alcohol.

3RD EMBODIMENT

As in the 1st Embodiment, except 15 ml decyl alcohol is used instead of tridecyl alcohol.

b 4TH EMBODIMENT

As in the 1st Embodiment, except 10 ml hexadecyl alcohol is used instead of tridecyl alcohol.

5TH EMBODIMENT

Blank Reagent I: Octyl, nonyl, decyl, tridecyl, or hexadecyl alcohol.
Blank Reagent II: Formamide.
Cholesterol Reagent: As in 1st Embodiment, except the alcohol is omitted.

The reagents are used in the following assay using a blank tube and a test tube;

Add 0.5 ml Blank Reagent I and 0.5 ml Blank Reagent II to the blank tube only. Proceed as in 1st Embodiment beginning with the addition of the Cholesterol Reagent.

CONCLUSION

An assay according to the novel concepts of the invention thus provides the multiple advantages of both simplicity corresponding to direct or one-step tests and accuracy of multiple-step or multiple-extraction tests, and also avoiding certain error-contributing aspects of the multiple-step processes. Thus the often-incompatible goals of both speed and accuracy are provided, along with relative ease and convenience of the test procedures, elimination of time and error of extraction steps while nevertheless attaining in effect the result of having fully performed such extractions to avoid a masking or other effect of the other chromophore-forming chromogens usually present in the sample or specimen being assayed.

Accordingly, it will thus be seen from the foregoing description of the invention according to the embodiments of the invention herein set forth, that the present invention provides a new and useful assay yielding quantitative determination of cholesterol in serum, plasma, or other biological material to be tested, and provides a method and reagents therefor, all having desired advantages and characteristics, and accomplishing the objects of the invention, including the objects and advantages hereinbefore pointed out and others which are inherent in the invention.

It will be understood that modifications and variations of the general and specific concepts of the overall assay may be effected without departing from the novel concepts of this invention; accordingly, the invention is not to be considered limited to the specific form or embodiments set forth herein for the purpose of disclosing and illustrating the inventive concepts discovered and herein applied.

What is claimed is:

1. A process for the quantitative colorimetric or spectrophotometric determination of cholesterol in serum, plasma, or other biological material to be tested, wherein the improvement comprises adding formamide to said material for preventing the formation of a chromophore from the cholesterol chromogen in the sample being assayed.

2. The process as set forth in claim 1 in which the formamide is added to a first portion of said material to prevent the said formation of the cholesterol chromophore to provide a blank measurement, and in which formamide is omitted from a second portion of said material to provide a test measurement, and comparing the blank measurement with the test measurement, whereby a quantitative determination of the cholesterol itself is achieved.

3. A process for the quantitative determination of cholesterol in serum, plasma, or other biological material to be tested, wherein the improvement comprises adding formamide and a high molecular weight alcohol to said material for preventing the formation of chromophore from the cholesterol chromogen in the sample being assayed, while permitting the formation of the chromophore from the bilirubin chromogen.

4. The process as set forth in claim 3, the alcohol having from eight to sixteen carbon atoms per molecule.

5. The process as set forth in claim 3 in which the alcohol is tridecyl alcohol.

6. The process as ser forth in claim 3 in which the alcohol is hexadecyl alcohol.

7. The process as set forth in claim 3 in which the high molecular weight alcohol is added to the cholesterol reagent.

8. A process for the quantitative determination of cholesterol in serum, plasma, or other biological material to be tested, wherein the improvement comprises adding formamide to block the formation of the chromophore from the cholesterol chromogen in a first portion of the sample while causing the non-cholesterol chromogenic substances in the said first portion of the sample to produce their chromophores, and in a second portion of the sample the step of
causing the formation of chromophore from the sample's substance including both its said non-cholesterol chromogenic substances and its cholesterol chromogen, by omitting formamide, and comparing the chromophore of the two sample portions to quantitatively determine the cholesterol content of the sample by the contrast of the chromophore produced in the two sample portions.

9. A process according to claim 8, in which a mixture of acetic acid, acetic anhydride, and sulfuric acid is added to the first and second portions to cause the non-cholesterol chromogenic substances in the said first portion of the sample to produce their chromophores and also to cause the formation of chromophore from the sample in the second portion of the reaction.

10. The process according to claim 9 in which the mixture includes a high molecular weight alcohol.

11. The process according to claim 10 in which the alcohol is tridecyl alcohol.

* * * * *

UNITED STATES PATENT OFFICE
CERTIFICATE OF CORRECTION

Patent No. 3,715,188     Dated February 6, 1973

Inventor(s) Jerry W. Denney

It is certified that error appears in the above-identified patent and that said Letters Patent are hereby corrected as shown below:

Column 1, lines 3 through 6, should appear in bold type. Column 5, line 32, after "colorimetric" insert -- measurement --. Column 7, line 24, cancel "b"; line 32, cancel "b". Column 8, line 66, "substance" should read -- substances --; last line, before "formamide" insert -- the --. Column 7, line 27, "tridecl" should read -- tridecyl --.

This certificate supersedes Certificate of Correction issued October 23, 1973.

Signed and sealed this 9th day of July 1974.

(SEAL)
Attest:

McCOY M. GIBSON, JR.         C. MARSHALL DANN
Attesting Officer            Commissioner of Patents